United States Patent
Ahn

(10) Patent No.: US 11,586,318 B2
(45) Date of Patent: Feb. 21, 2023

(54) INTEGRATED CIRCUIT AND TIMING CONTROLLER FOR DRIVING PANEL

(71) Applicant: SILICON WORKS CO., LTD., Daejeon (KR)

(72) Inventor: Yong Sung Ahn, Daejeon (KR)

(73) Assignee: SILICON WORKS CO., LTD., Daejeon (KR)

(*) Notice: Subject to any disclaimer, the term of this patent is extended or adjusted under 35 U.S.C. 154(b) by 150 days.

(21) Appl. No.: 17/128,919

(22) Filed: Dec. 21, 2020

(65) Prior Publication Data
US 2021/0191591 A1 Jun. 24, 2021

(30) Foreign Application Priority Data
Dec. 24, 2019 (KR) .................. 10-2019-0173634

(51) Int. Cl.
*G06F 3/041* (2006.01)
*G09G 3/3258* (2016.01)
*G06F 3/044* (2006.01)

(52) U.S. Cl.
CPC .......... *G06F 3/04162* (2019.05); *G06F 3/044* (2013.01); *G06F 3/0412* (2013.01); *G09G 3/3258* (2013.01); *G09G 2310/08* (2013.01); *G09G 2320/0626* (2013.01); *G09G 2360/147* (2013.01)

(58) Field of Classification Search
CPC .... G06F 3/04162; G06F 3/0412; G06F 3/044; G09G 3/3258; G09G 2310/08; G09G 2320/0626; G09G 2360/147
See application file for complete search history.

(56) References Cited

U.S. PATENT DOCUMENTS

2019/0317630 A1 10/2019 Shaw

FOREIGN PATENT DOCUMENTS

| KR | 20160092090 A | * | 8/2016 | ............... G09G 3/20 |
| KR | 10-2018-0024904 A | | 3/2018 | |
| KR | 10-2018-0061471 A | | 6/2018 | |
| KR | 102293371 B1 | * | 8/2021 | ............... G09G 3/20 |

OTHER PUBLICATIONS

Machine translation for KR 2016-0092090 (Year: 2022).*
Machine translation for KR 10-2293371 (Year: 2022).*

* cited by examiner

*Primary Examiner* — Michael Pervan
(74) *Attorney, Agent, or Firm* — Fenwick & West LLP

(57) ABSTRACT

An embodiment may integrate a data driving circuit, a pixel sensing circuit, and a touch sensing circuit into one integrated circuit, thereby simplifying interfaces and wires between circuits and reducing the number of components.

14 Claims, 12 Drawing Sheets

*FIG. 6*
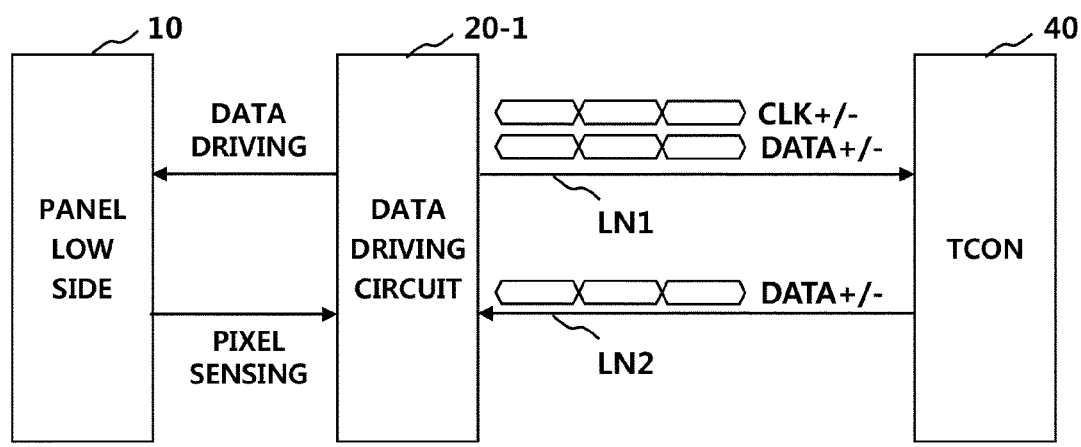
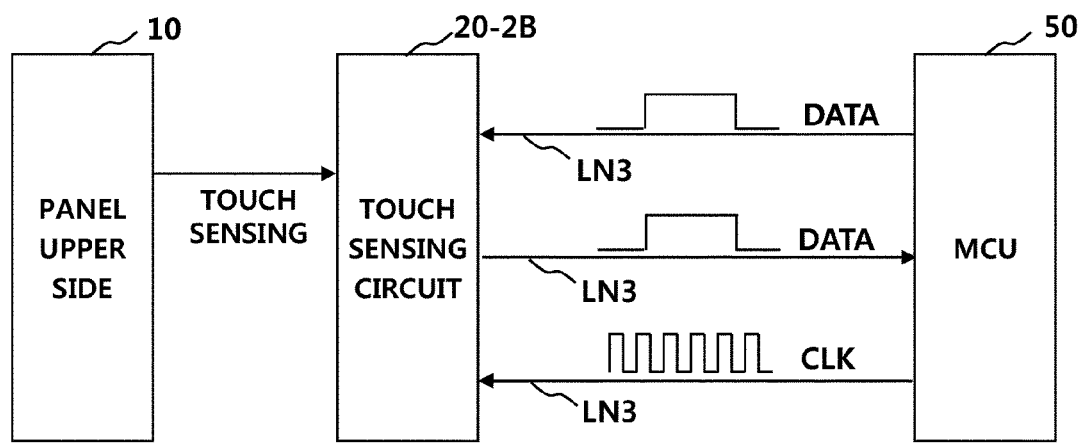

INTEGRATED CIRCUIT AND TIMING CONTROLLER FOR DRIVING PANEL

CROSS REFERENCE TO RELATED APPLICATION

This application claims priority from Republic of Korea Patent Application No. 10-2019-0173634, filed on Dec. 24, 2019, which is hereby incorporated by reference in its entirety.

BACKGROUND

1. Field of Technology

The present embodiment relates to an integrated circuit including a data driving circuit, a pixel sensing circuit, and a touch sensing circuit, and a display device including the same.

2. Description of the Prior Art

The display device may include a panel and panel driving circuits for driving the panel. The panel includes a plurality of pixels arranged horizontally and vertically to form a matrix, and the plurality of arranged pixels is positioned on the panel like a matrix. In addition, the panel may include a plurality of touch electrodes for sensing a touch or proximity of an external object.

The panel driving circuits may drive the pixels and touch electrodes of the panel. The panel driving circuits may include a data driving circuit, a pixel sensing circuit, and a touch sensing circuit. The data driving circuit may determine data voltages according to image data, and may supply the data voltages to the pixels, thereby driving the panel. The pixel sensing circuit may drive the panel by sensing the voltages of the pixels in order to compensate for the difference in brightness between the pixels according to the characteristics of the pixels. The touch sensing circuit may drive the panel by sensing a change in capacitance of a touch electrode that an external object touches or approaches.

Meanwhile, the pixel includes a light-emitting device, and an organic light-emitting diode (OLED) is one of the most widely used light-emitting devices in recent years. The OLED has flexibility in visibility, color reproducibility, and mechanical design, so the OLED may be mostly used in a display device mounted to a vehicle (e.g., a cluster). The OLED panel of a vehicle may also include a touch pattern including touch electrodes for sensing a touch or proximity, as well as pixels. That is, both displaying and touch sensing may be implemented in the panel.

However, in terms of circuits, the data driving circuit for outputting image data and the touch sensing circuit for driving the touch electrodes are separated from each other. If the data driving circuit and the touch sensing circuit are separated, interfaces or wires between circuits becomes complicated, and the number of components increases according thereto. Thereby, power consumption or electromagnetic interference (EMI) may further occur or increase in each component.

SUMMARY

In this regard, the present embodiment is to provide an integrated circuit that simplifies the interfaces and wires between circuits and reduces the number of components by integrating panel driving circuits, thereby reducing power consumption or electromagnetic interference, and a display device including the same.

An aspect of the present embodiment is to provide a technology for integrating a data driving circuit, a pixel sensing circuit, and a touch sensing circuit.

Another aspect of the present embodiment is to provide a technology for integrating a pixel sensing circuit and a touch sensing circuit by sharing communication lines.

Another aspect of the present embodiment is to provide a timing controller for relaying sensing data on a touch or proximity of an external object to a microcontroller, and data communication technology therefor.

In view of the foregoing, an embodiment provides an integrated circuit for driving a panel through a plurality of internal circuits, which includes: a first internal circuit configured to perform first sensing on a panel; and a second internal circuit configured to perform second sensing different from the first sensing on the panel, wherein the first internal circuit drives a pixel disposed on the panel so as to sense characteristics of the pixel, and wherein the second internal circuit drives a touch electrode disposed on the panel so as to sense a touch or proximity of an external object.

In the integrated circuit, the first internal circuit may sense a variation of an organic light-emitting diode (OLED) and a driving transistor included in the pixel caused by deterioration or by a manufacturing process thereof.

In the integrated circuit, the first internal circuit and the second internal circuit may share an integrator configured to generate sensing data on the characteristics of the pixel or sensing data on the touch or proximity.

The integrated circuit may further include switches configured to connect the integrator to the pixel in order to sense the characteristics of the pixel or connect the integrator to the touch electrode in order to sense the touch or proximity.

The integrated circuit may further include a first signal adjusting circuit configured to increase the intensity of a pixel response signal including information on the characteristics of the pixel.

The integrated circuit may further include a second signal adjusting circuit configured to reduce the intensity of a touch response signal including information on the touch or proximity.

In the integrated circuit, the first internal circuit and the second internal circuit may share a communication line in order to exchange data with an external circuit.

The integrated circuit may further include a third internal circuit configured to apply a data voltage for the image data to the pixel in order to output the image data.

In the integrated circuit, the third internal circuit may use a communication line, which is different from the communication line used by the first internal circuit and the second internal circuit, in order to exchange data with an external circuit.

In the integrated circuit, the second internal circuit may transmit sensing data on the touch or proximity to a timing controller.

In the integrated circuit, the first internal circuit and the second internal circuit may be disposed to be positioned at one side of the panel so as to drive the panel.

Another embodiment provides a timing controller that includes: a receiving circuit configured to receive first sensing data on the characteristics of a pixel and second sensing data on a touch or proximity of an external object through a first communication line; and a transmitting circuit configured to transmit the second sensing data to an external circuit.

The timing controller may further include a controlling circuit configured to compensate for image data using the first sensing data, and the transmitting circuit may transmit the image data to an integrated circuit configured to apply a data voltage corresponding to the image data to the pixel.

In the timing controller, the transmitting circuit may transmit the image data to the integrated circuit through a second communication line different from the first communication line.

In the timing controller, the transmitting circuit may use a third communication line to transmit the second sensing data to a microcontroller, and in the first communication line or the second communication line, data may be received as a signal of a lower level than that in the third communication line.

In the timing controller, the controlling circuit generates coordinates for the touch or proximity using the second sensing data.

As described above, according to the present embodiment, it is possible to simplify interfaces and wires between circuits and to reduce the number of components by integrating a data driving circuit, a pixel sensing circuit, and a touch sensing circuit into one integrated circuit.

In addition, according to the present embodiment, it is possible to reduce power consumption or electromagnetic interference by simplifying the internal configuration and reducing the number of components.

Further, according to the present embodiment, it is possible to reduce the cost of manufacturing the circuits for the display device by simplifying the internal configuration and reducing the number of components.

BRIEF DESCRIPTION OF THE DRAWINGS

The above and other aspects, features, and advantages of the present disclosure will be more apparent from the following detailed description taken in conjunction with the accompanying drawings, in which:

FIG. 6 is a diagram illustrating the positions where data driving, pixel sensing, and touch sensing occur on the basis of a panel;

DETAILED DESCRIPTION

Figure 1:
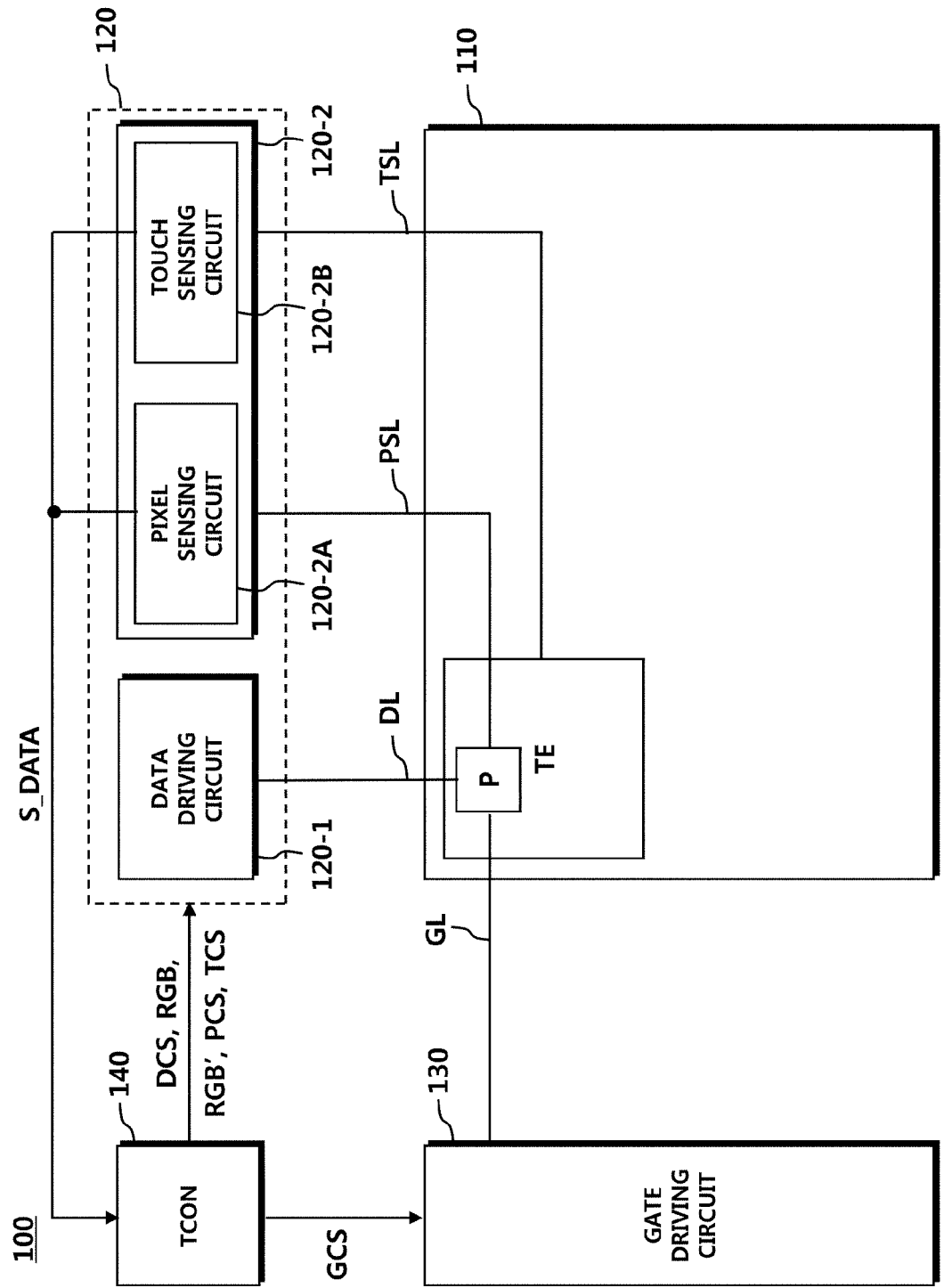
FIG. 1 is a block diagram of a display device according to an embodiment.

FIG. 1 is a block diagram of a display device according to an embodiment.

Referring to FIG. 1, a display device 100 may include a panel 110 and panel driving circuits 120, 130, and 140 for driving the panel 110.

The panel 110 may have a plurality of data lines DL formed therein so as to be connected to a data driving circuit 120-1, a plurality of gate lines GL formed therein so as to be connected to the gate driving circuit 130, a plurality of sensing lines PSL formed therein so as to be connected to the pixel sensing circuit 120-2A, and a plurality of sensing lines TSL formed therein so as to be connected to the touch sensing circuit 120-2B. In addition, the panel 110 may have a plurality of pixels P defined at intersection points of the plurality of data lines DL and the plurality of gate lines GL corresponding thereto.

Each pixel P may have a transistor including a first electrode (e.g., a source electrode or a drain electrode) connected to the data line DL, a gate electrode connected to the gate line GL, and a second electrode (e.g., a drain electrode or a source electrode) connected to a display electrode.

In addition, the panel 110 may further have a plurality of touch electrodes TE formed therein so as to be spaced apart from each other. One pixel P or a plurality of pixels P may be provided in the region where the touch electrode TE is located.

The panel 110 may include a display panel and a touch panel (i.e., a screen panel (TSP)), wherein the display panel and the touch panel may share some elements with each other. For example, a plurality of touch electrodes TE may be one configuration of a display panel (e.g., a common electrode applying a common voltage or a cathode electrode of an organic light-emitting diode (OLED)), and may also be one configuration of a touch panel (touch electrodes for detecting a touch). This panel 110 may be referred to as an "integrated type panel", considering that some elements of the display panel and the touch panel are shared with each other, but the present disclosure is not limited thereto. In addition, although an in-cell type panel is known as a panel in which some elements of the display panel and the touch panel are shared with each other, this is only an example of the panel 110 described above, and the panel, to which the present disclosure is applied, is not limited to the in-cell type panel.

Meanwhile, the panel 110 may be an OLED panel. In this case, the pixels P disposed on the panel 110 may include organic light-emitting diodes (OLEDs) and one or more transistors. The characteristics of the OLED and transistor included in each pixel P may vary depending on time or the surrounding environment. The pixel sensing circuit 120-2A according to an embodiment may sense the characteristics of the above elements included in each pixel P and may transmit the same to the timing controller 140.

Circuits 120, 130, and 140 that drive at least one element included in the panel 110 may be referred to as "panel driving circuits". For example, the integrated circuit 120, the gate driving circuit 130, or the timing controller 140 may be referred to as a "panel driving circuit". Each of the above-described circuits 120, 130, and 140 may be referred to as a "panel driving circuit", and all or a plurality of circuits may be referred to as a "panel driving circuit".

In the panel driving circuit, the gate driving circuit 130 may supply scan signals of a turn-on voltage or a turn-off voltage to the gate lines GL. If a scan signal of a turn-on voltage is supplied to a pixel P, the pixel P may be connected to the data line DL, and if a scan signal of a turn-off voltage is supplied to a pixel P, the connection between the pixel P and the data line DL may be released.

In the panel driving circuit, the timing controller 140 may supply various types of control signals to the gate driving circuit 130 and the integrated circuit 120. The timing controller 140 may generate a gate control signal GCS for starting scanning according to a timing implemented in each frame and may transmit the same to the gate driving circuit 130.

The timing controller 140 may transmit image data input from the outside to the integrated circuit 120. The timing controller 140 may output, to the integrated circuit 120, image data RGB obtained by converting the image data into a data signal format used in the data driving circuit 120-1. In addition, the timing controller 140 may transmit a data control signal DCS for controlling the data driving circuit 120-1 to supply a data voltage to each pixel P according to each timing.

The timing controller 140 may transmit a pixel sensing control signal PCS for controlling the pixel sensing circuit 120-2A to apply a reference voltage to the pixel, thereby sensing the characteristics of the pixel (e.g., deterioration). In addition, the timing controller 140 may compensate for image data RGB according to the characteristics of the pixel P and may transmit compensated image data RGB'. At this time, the timing controller 140 may receive sensing data S_DATA from the pixel sensing circuit 120-2A. The sensing data S_DATA may include measurement values for the characteristics of the pixel P.

The timing controller 140 may transmit a touch control signal TCS for controlling the touch sensing circuit 120-2B to supply driving signals to the touch electrodes TE, thereby sensing a touch or proximity of an external object. In addition, the timing controller 140 may receive sensing data S_DATA from the touch sensing circuit 120-2B. The sensing data S_DATA may include a measurement value for a change in capacitance of the touch electrode TE.

In the panel driving circuit, the integrated circuit 120 may include a data driving circuit 120-1 and a sensing circuit 120-2. A data driving function and a panel sensing function may be integrated into the integrated circuit 120 so that the integrated circuit 120 may perform both a data driving operation and a panel sensing operation.

The sensing circuit 120-2 may include a pixel sensing circuit 120-2A and a touch sensing circuit 120-2B. A pixel sensing function and a touch sensing function may be integrated into the sensing circuit 120-2 so that the sensing circuit 120-2 may perform both a pixel sensing operation and a touch sensing operation.

The data driving circuit 120-1 of the integrated circuit 120 may supply a data voltage to the data line DL. The data voltage supplied to the data line DL may be transmitted to the pixel P connected to the data line DL according to the scan signal.

The data driving circuit 120-1 may be connected to a bonding pad of the panel 110 by a tape-automated bonding (TAB) method or a chip-on-glass (COG) method, or may be formed directly on the panel 110, or in some cases, the data driving circuit 120-1 may be integrated and formed on the panel 110. In addition, the data driving circuit 120-1 may be implemented by a chip-on-film (COF) method.

In the integrated circuit 120, the pixel sensing circuit 120-2A receives an analog signal (e.g., a voltage, a current, etc.) generated in each pixel P. The pixel sensing circuit 120-2A may be connected to each pixel P according to a scan signal or may be connected to each pixel P according to a separate signal. In this case, the separate signal may be generated by the gate driving circuit 130.

In the integrated circuit 120, the touch sensing circuit 120-2B may apply driving signals to all or some of a plurality of touch electrodes TE connected to the sensing lines TSL.

In addition, although it is illustrated in FIG. 1 that one touch sensing circuit 120-2B is provided in the display device 100, the display device 100 may include two or more touch sensing circuits 120-2B.

Meanwhile, in order for the touch sensing circuit 120-2B to apply driving signals to all or some of the plurality of touch electrodes TE, a sensing line TSL connected to each of the plurality of touch electrodes TE is required. Accordingly, the sensing lines TSL, which are connected to the respective touch electrodes TE and transmit driving signals thereto, may be formed on the panel 110 in a first direction (e.g., a vertical direction) or a second direction (e.g., a horizontal direction).

Meanwhile, the display device 100 may employ a capacitive touch scheme of recognizing the proximity or touch of an object by sensing a change in capacitance through a touch electrode TE.

The capacitive touch scheme may be divided into, for example, a mutual-capacitance touch scheme and a self-capacitance touch scheme.

The mutual-capacitance touch scheme, which is a type of capacitive touch scheme, may apply a driving signal to one touch electrode (Tx electrode), and may sense another touch electrode (Rx electrode) that is mutually coupled with the Tx electrode. In this mutual-capacitance touch scheme, the value sensed in the Rx electrode varies depending on the proximity or touch of an object such as a finger, a pen, or the like. The mutual-capacitance touch scheme makes it possible to detect whether or not a touch is made, touch coordinates, or the like using the value sensed in the Rx electrode.

In the self-capacitance touch scheme, which is another type of capacitive touch scheme, a driving signal may be applied to one touch electrode TE, and then the corresponding one touch electrode TE may be sensed again. In the self-capacitance touch scheme, a value sensed in the corresponding one touch electrode TE differs depending on the proximity or touch of an object such as a finger, a pen, or the like. The self-capacitance touch scheme makes it possible to detect whether or not a touch is made, touch coordinates, or the like using the sensed value. In the self-capacitance touch scheme, since the touch electrode TE, to which a driving signal is applied, is the same as the touch electrode TE to be sensed, there may be no distinction between the Tx electrode and the Rx electrode.

The display device 100 may employ one or all of the two capacitive touch schemes described above (i.e., the mutual-capacitance touch scheme and the self-capacitance touch scheme). However, in the present specification, for convenience of description, embodiments will be described on the assumption that the self-capacitance touch scheme is adopted.

Meanwhile, the display device 100 may separately drive the touch electrodes TE between a display region and a touch region. For example, the touch sensing circuit 120-2B of the display device 100 may not apply the driving signals to all or some of the touch electrodes TE in the region in which data signals are supplied.

In addition, the display device 100 may drive the touch electrodes TE without distinguishing between the display region and the touch region. For example, the touch sensing circuit 120-2B of the display device 100 may apply driving signals to all or some of the touch electrodes TE in the region in which data signals are supplied.

Figure 2:
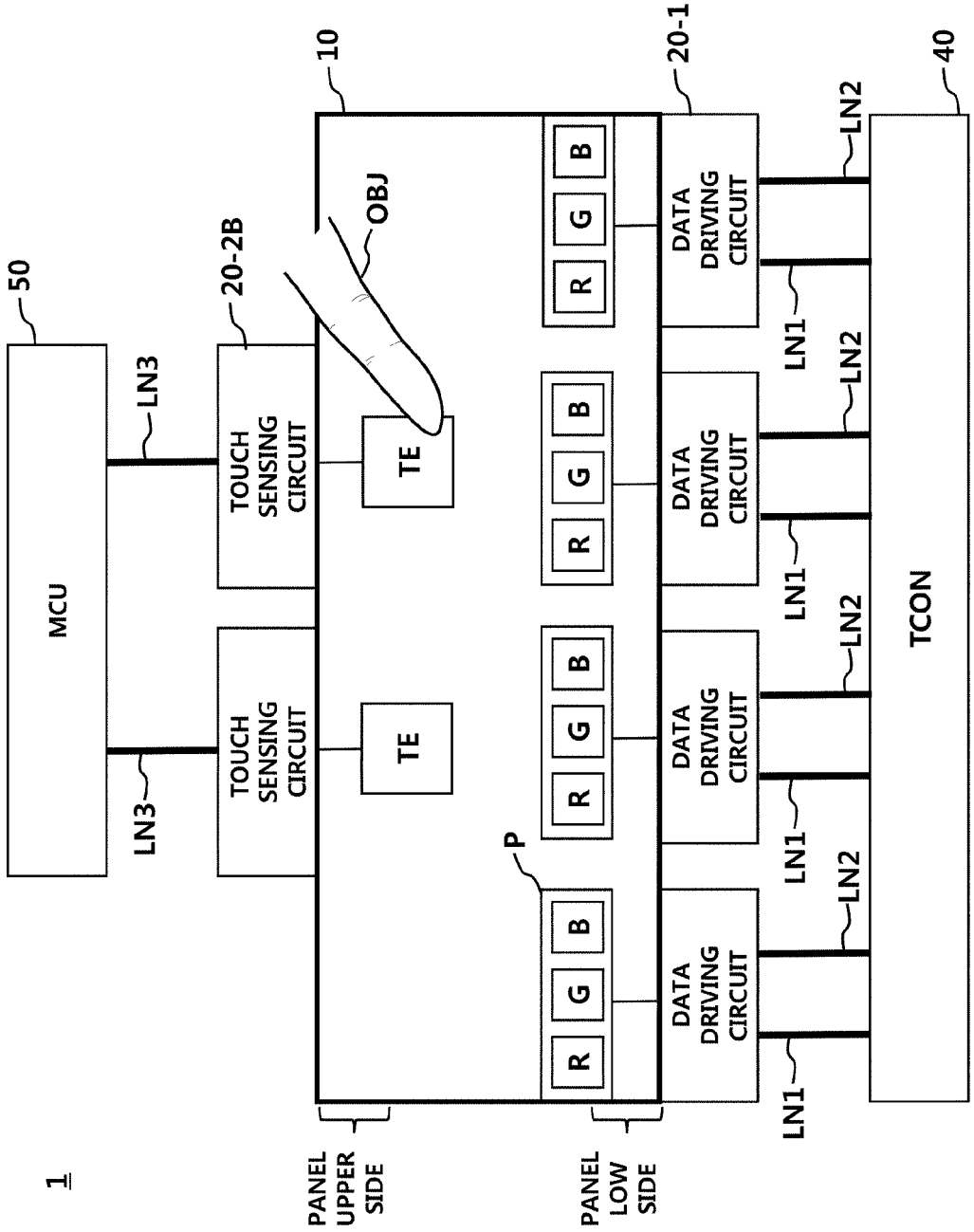
FIG. 2 is a diagram illustrating connections between a panel and panel driving circuits.

FIG. 2 is a diagram illustrating connections between a panel and panel driving circuits.

Referring to FIG. 2, the display device 1 may further include a microcontroller (MCU) 50. The microcontroller 50 may receive sensing data on a touch or proximity of an external object OBJ from the touch sensing circuit 20-2B, may generate coordinates thereof, and may transmit the coordinates to a host. In addition, the data driving circuit 20-1 may include a pixel sensing circuit (not shown), thereby sensing the characteristics of a pixel, as well as outputting image data.

Conventionally, the panel driving circuits of the display device 1 may be separated to be disposed at respective sides of the panel 10. For example, data driving circuits 20-1 and a timing controller 40 may be disposed at the lower side of the panel 10 (PANEL LOW SIDE), and touch sensing circuits 20-2B and a microcontroller 50 may be disposed at the upper side of the panel 10 (PANEL UPPER SIDE).

The display device 1 may include a plurality of data driving circuits 20-1 and a timing controller 40 for controlling the same and may include a plurality of touch sensing circuits 20-2B and a microcontroller 50 for controlling the same.

For example, the display device 1 may output image data through a total of 3864 channels, and 24 channels thereof may be dummy channels. The channel through which image data is output may be referred to as a "data channel". The display device 1 may include four data driving circuits 20-1 that divide the data channels and drive the divided channels, respectively. Each of the four data driving circuits 20-1 may drive 966 data channels.

In addition, the display device 1 may sense the characteristics of pixels through a total of 3864 channels. Since pixel sensing is performed for each pixel, the number of channels for pixel sensing may be the same as the number of channels for outputting image data. 24 channels thereof may be dummy channels. The channel for sensing the characteristics of a pixel may be referred to as a "pixel sensing channel". The display device 1 may include four data driving circuits 20-1 that divide the pixel sensing channels and drive the divided channels, respectively. Each of the four data driving circuits 20-1 may drive 966 pixel sensing channels.

Meanwhile, the display device 1 may sense a touch or proximity of an external object OBJ through a total of 180 channels. In contrast to the data channel, the channel, through which a driving signal is output in order to sense a touch or proximity, may be referred to as a "touch channel". The display device 1 may include two touch sensing circuits 20-2B that divide the touch channels and drive the divided touch channels, respectively. Each of the two touch sensing circuits 20-2B may drive 90 touch channels.

At the lower side of the panel 10, the data driving circuit 20-1 may transmit sensing data on the characteristics of a pixel P to the timing controller 40. The sensing data on the characteristics of a pixel P may be transmitted through a first communication line LN1 by a low-voltage differential signaling (LVDS) scheme.

At the lower side of the panel 10, the timing controller 40 may transmit image data to the data driving circuit 20-1 through a second communication line LN2. The image data may be transmitted through the second communication line LN2 by an embedded clock point-point interface (EPI) scheme or a clock embedded data signaling (CEDS) scheme.

At the upper side of the panel 10, the touch sensing circuit 20-2B may drive the touch electrode TE and may transmit sensing data on a touch or proximity of the external object OBJ to the microcontroller 50. In addition, the microcontroller 50 may transmit a clock or data for controlling the touch sensing circuit 20-2B to the touch sensing circuit 120-2B. The sensing data on a touch or proximity, the clock, and the control data may be transmitted through a third communication line LN3 by a serial peripheral interface (SPI) scheme or an inter-integrated circuit (I2C) scheme.

Figure 3:
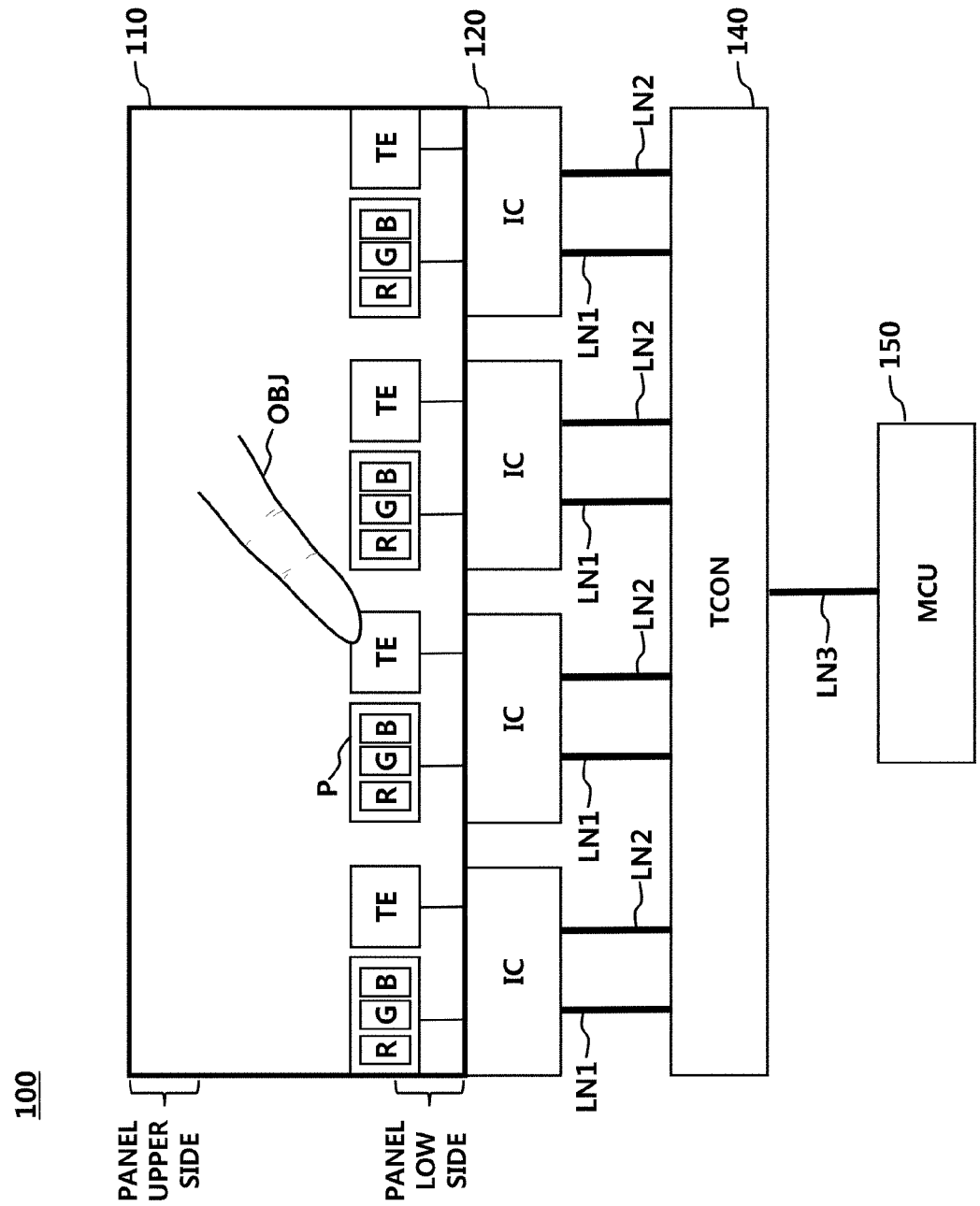
FIG. 3 is a diagram illustrating connections between a panel and panel driving circuits according to an embodiment.

FIG. 3 is a diagram illustrating connections between a panel and panel driving circuits according to an embodiment.

Referring to FIG. 3, a display device 100 according to an embodiment may further include a microcontroller 150. The microcontroller 150 may receive sensing data on a touch or proximity of an external object OBJ from an integrated circuit 120, may generate coordinates thereof, and may transmit the coordinates to a host. The timing controller 140 may generate the coordinates according to design and may transmit the same to the host. In addition, the integrated circuit 120 may include a pixel sensing circuit (not shown) and a touch sensing circuit (not shown), thereby sensing the characteristics of a pixel and a touch or proximity of an external object OBJ, as well as outputting image data.

Some of the panel driving circuits of the display device 100 according to an embodiment may be integrated so as to be disposed at one side of the panel 110. For example, the integrated circuit 120 including the data driving circuit, the pixel sensing circuit, and the touch sensing circuit, the timing controller 140, and the microcontroller 150 may be disposed only at the lower side of the panel 110 (PANEL LOW SIDE).

The display device 100 may include a plurality of integrated circuits 120, and a timing controller 140 and a microcontroller 150 for controlling the same.

For example, in the above-described example, the data driving circuits of the integrated circuits 120 may drive a total of 3864 data channels in order to output image data. The display device 100 may include four integrated circuits 120 that divide the data channels and drive the divided data channels, respectively. Each of the four integrated circuits 120 may drive 966 data channels.

In addition, in the above-described example, the pixel sensing circuits of the integrated circuits 120 may drive a total of 3864 pixel sensing channels in order to sense the characteristics of a pixel. The display device 100 may include four integrated circuits 120 that divide the pixel sensing channels and drive the divided pixel sensing channels, respectively. Each of the four integrated circuits 120 may drive 966 pixel sensing channels.

Meanwhile, in the above-described example, the touch sensing circuits of the integrated circuits 120 may drive a total of 180 touch sensing channels in order to sense a touch or proximity of an external object OBJ. The display device 100 may include four integrated circuits 120 that divide the touch sensing channels and drive the divided touch sensing channels, respectively. Each of the four integrated circuits

120 may drive 45 touch sensing channels. Alternatively, only some of the plurality of integrated circuits 120 may include a touch sensing circuit. The display device 100 may include two integrated circuits 120 that divide the touch sensing channels and drive the divided touch sensing channels, respectively. Each of the two integrated circuits 120 may drive 90 touch sensing channels.

At the lower side of the panel 10, the integrated circuit 120 may transmit sensing data on the characteristics of a pixel P to the timing controller 140. The sensing data on the characteristics of the pixel P may be transmitted through a first communication line LN1 by an LVDS scheme.

At the lower side of the panel 10, the timing controller 40 may transmit image data to the integrated circuit 120 through a second communication line LN2. The image data may be transmitted through the second communication line LN2 by an EPI scheme or a CEDS scheme.

At the lower side of the panel 10, the integrated circuit 120 may drive the touch electrodes TE and may transmit sensing data on a touch or proximity of an external object OBJ to the timing controller 140. In addition, the timing controller 140 may transmit a clock or data for controlling the touch sensing circuit to the touch sensing circuit. The sensing data on a touch or proximity, the clock, and the control data may be transmitted through the first communication line LN1 by an LVDS scheme.

Here, the timing controller 140 may relay data between the integrated circuit 120 and the microcontroller 150. For example, the timing controller 140 may receive sensing data on a touch or proximity of an external object OBJ from the integrated circuit 120 and may transmit the same to the microcontroller 150. The timing controller 140 may receive a clock and control data from the microcontroller 150 and may transmit the same to the integrated circuit 120. The sensing data on a touch or proximity, the clock, and the control data may be transmitted through a third communication line LN3 by an SPI scheme or an I2C scheme.

Figure 4:
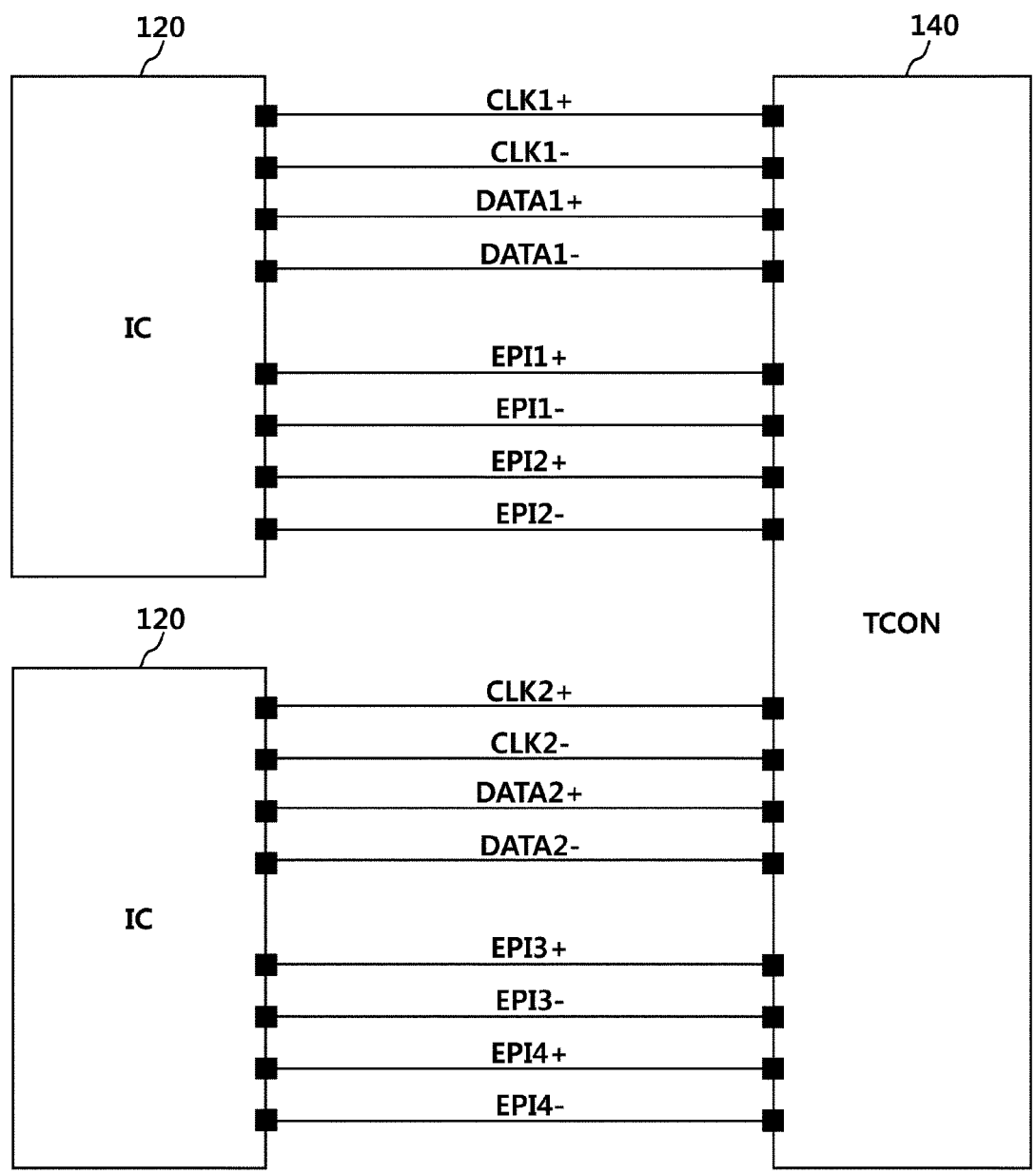
FIG. 4 is a diagram illustrating data communication between an integrated circuit and a timing controller according to an embodiment.

FIG. 4 is a diagram illustrating data communication between an integrated circuit and a timing controller according to an embodiment.

Referring to FIG. 4, signals transmitted and received through a first communication line and a second communication line are illustrated.

The integrated circuit 120 may transmit sensing data to the timing controller 140 through a first communication line by an LVDS scheme. The sensing data may include pixel sensing data including a measurement value for the characteristics of a pixel and touch sensing data including a measurement value for a touch or proximity of an external object OBJ. Therefore, the pixel sensing circuit and the touch sensing circuit of the integrated circuit 120 may share the first communication line in order to transmit the pixel sensing data and the touch sensing data to the timing controller 140. If the display device operates in order to sense a pixel, the first communication line may be used by the pixel sensing circuit, and if the display device operates in order to sense a touch or proximity, the first communication line may be used by the touch sensing circuit.

The integrated circuit 120 may receive, from the timing controller 140, image data or image data compensated for using the pixel sensing data through a second communication line by an EPI scheme. The image data may be transmitted through a second communication line different from the first communication line through which the sensing data is transmitted. Therefore, the data driving circuit of the integrated circuit 120 may exclusively use the second communication line in order to receive image data. Regardless of whether the display device senses a pixel or a touch or proximity, the first communication line may be used by the data driving circuit.

The first communication line based on an LVDS scheme may include a plurality of communication lines, and differential signals for a clock or data may be transmitted/received through each communication line. For example, in order to transmit a clock to the timing controller 140, the integrated circuit 120 may transmit a first high-level clock signal CLK1+ and a first low-level clock signal CLK1− through a separate line. The timing controller 140 may calculate a difference between the first high-level clock signal CLK1+ and the first low-level clock signal CLK1−, thereby obtaining a clock. In addition, in order to transmit sensing data to the timing controller 140, the integrated circuit 120 may transmit a first high-level data signal DATA1+ and a first low-level data signal DATA1− through a separate lines. The timing controller 140 may calculate a difference between the first high-level data signal DATA1+ and the first low-level data signal DATA1−, thereby obtaining sensing data.

Likewise, the second communication line based on an EPI scheme may include a plurality of communication lines, and differential signals for data or data including a clock may be transmitted/received through each communication line. For example, in order to transmit image data to the integrated circuit 120, the timing controller 140 may transmit a first high-level EPI signal EPI1+ and a first low-level EPI signal EPI1− through a separate line. The integrated circuit 120 may calculate a difference between the first high-level EPI signal EPI1+ and the first low-level EPI signal EPI1−, thereby obtaining image data. In addition, in order to further transmit image data to the integrated circuit 120, the timing controller 140 may transmit a second high-level EPI signal EPI2+ and a second low-level EPI signal EPI2− through a separate line. The integrated circuit 120 may calculate a difference between the second high-level EPI signal EPI2+ and the second low-level EPI signal EPI2−, thereby obtaining image data.

The timing controller 140 may transmit and receive data to and from a plurality of integrated circuits 120. For example, in order to transmit another clock and another piece of sensing data to the timing controller 140 by an LVDS scheme, the integrated circuit 120 may transmit a differential signal including a second high-level clock signal CLK2+ and a second low-level clock signal CLK2− to the timing controller 140, and may transmit a differential signal including a second high-level data signal DATA2+ and a second low-level data signal DATA2− to the timing controller 140. In addition, in order to transmit another piece of image data to the integrated circuit 120 by an EPI scheme, the timing controller 140 may transmit a differential signal including a third high-level EPI signal EPI3+ and a third low-level EPI signal EPI3− to the integrated circuit 120, and may transmit a differential signal including a fourth high-level EPI signal EPI4+ and a fourth low-level EPI signal EPI4− to the integrated circuit 120.

Figure 5:
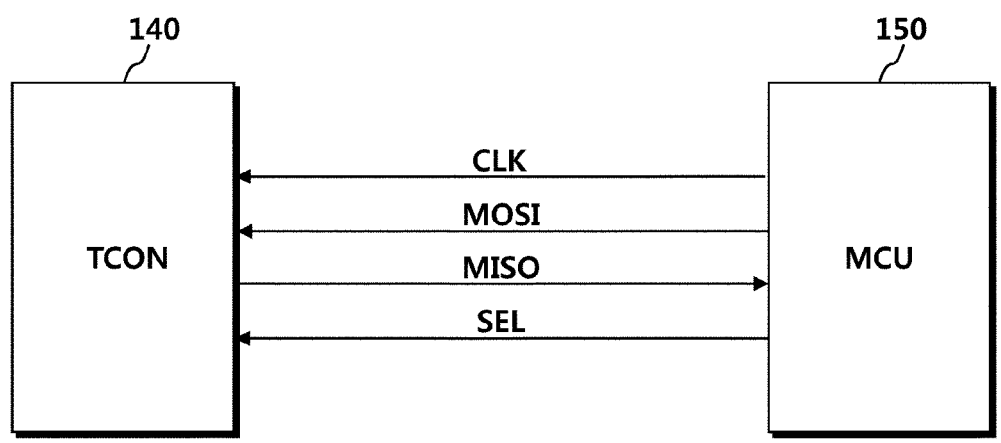
FIG. 5 is a diagram illustrating data communication between a timing controller and a microcontroller according to an embodiment.

FIG. 5 is a diagram illustrating data communication between a timing controller and a microcontroller according to an embodiment.

Referring to FIG. 5, signals transmitted and received through a third communication line are shown.

The timing controller 140 may transmit touch sensing data to the microcontroller 150 through a third communication line by an SPI scheme. The timing controller 140 may receive touch sensing data from the integrated circuit 120 and may transmit the same to the microcontroller 150.

The third communication line based on the SPI scheme may include a plurality of communication lines, and a signal for a clock or data may be transmitted and received through each communication line. For example, the microcontroller 150 may transmit a clock signal CLK to the timing controller 140 through one line. The microcontroller 150 may transmit, to the timing controller 140, a control signal MOSI for controlling the touch sensing circuit through another line. The microcontroller 150 may transmit, to the timing controller 140, a selection signal SEL for selecting the timing controller 140 to operate as a slave through another line. In addition, the timing controller 140 may transmit a touch sensing signal MISO including touch sensing data to the microcontroller 150. As described above, the timing controller 140 may relay touch sensing data between the touch sensing circuit of the integrated circuit 120 and the microcontroller 150 by the SPI scheme.

FIG. 6 is a diagram illustrating the positions where data driving, pixel sensing, and touch sensing occur on the basis of a panel.

Referring to FIG. 6, conventionally, data driving and pixel sensing may occur at one side of the panel, and touch sensing may occur at the opposite side of the panel.

For example, a data driving circuit 20-1 may be disposed at the lower side of the panel so as to perform a pixel sensing function. The data driving circuit 20-1 may sense the characteristics of a pixel, as well as applying data voltages corresponding to image data, at the lower side of the panel.

A timing controller 40 communicating with the data driving circuit 20-1 may be disposed at the lower side of the panel. Thus, the data driving circuit 20-1 may transmit pixel sensing data DATA+/− in the form of a differential signal and clocks CLK+/− in the form of a differential signal to the timing controller 40 through a first communication line LN1. In addition, the timing controller 40 may transmit image data DATA+/− in the form of a differential signal to the data driving circuit 20-1 through a second communication line LN2.

Meanwhile, a touch sensing circuit 20-2B may be disposed at the upper side of the panel so as to perform a touch sensing function. The touch sensing circuit 20-2B may sense a touch or proximity of an external object at the upper side of the panel.

A microcontroller 50 communicating with the touch sensing circuit 20-2B may be disposed at the upper side of the panel. Thus, the microcontroller 50 may transmit control data DATA and a clock CLK for the touch sensing circuit 20-2B to the touch sensing circuit 20-2B through a third communication line LN3. In addition, the touch sensing circuit 20-2B may transmit touch sensing data DATA to the microcontroller 50 through the third communication line LN3.

As described above, the conventional display device may require multiple panel driving circuits because the panel is driven at the lower and upper sides thereof. Accordingly, interfaces or wires between the circuits become complicated, and the number of elements increases according thereto, which may result in additional power consumption or electromagnetic interference or an increase in power consumption or electromagnetic interference in each component.

Figure 7:
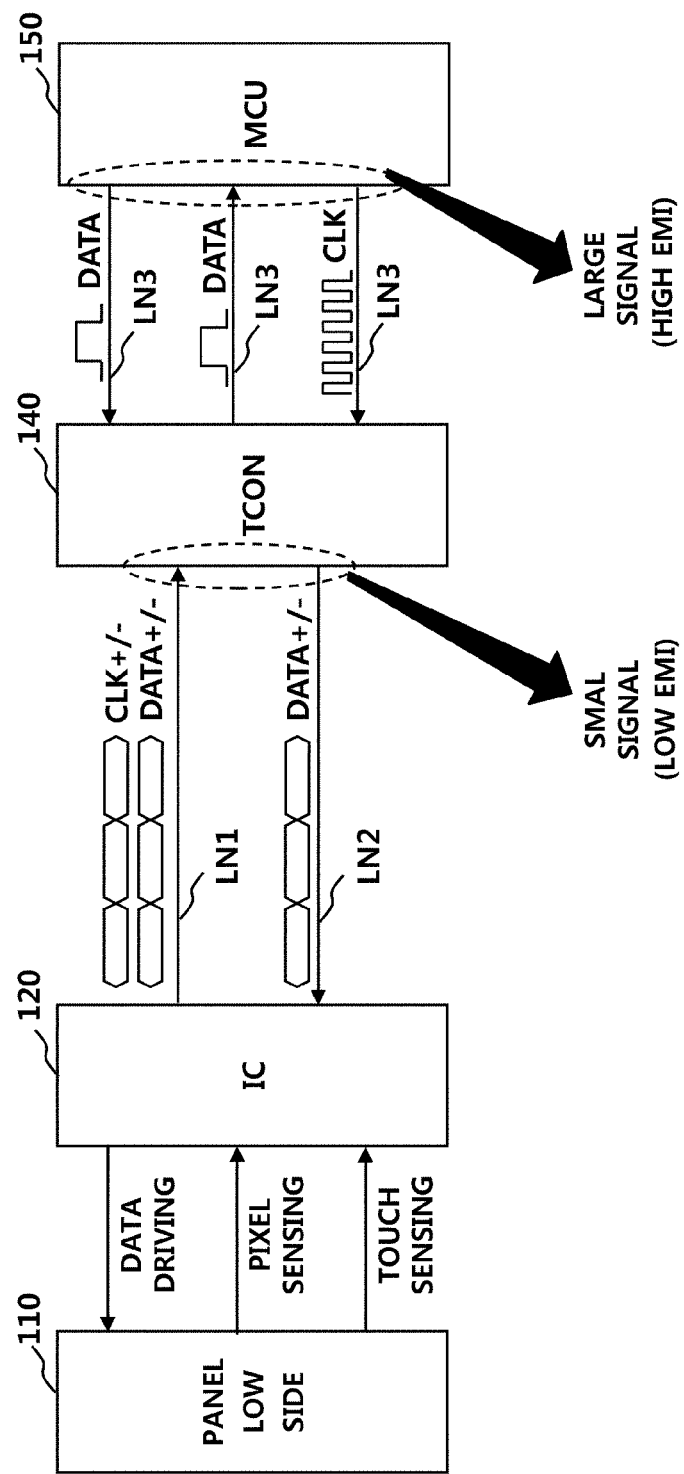
FIG. 7 is a diagram illustrating the positions where data driving, pixel sensing, and touch sensing occur on the basis of a panel according to an embodiment.

FIG. 7 is a diagram illustrating the positions where data driving, pixel sensing, and touch sensing occur on the basis of a panel according to an embodiment.

Referring to FIG. 7, according to an embodiment, data driving, pixel sensing, and touch sensing may occur at one side of a panel.

For example, an integrated circuit 120 may be disposed at the lower side of the panel so as to perform a data driving function, a pixel sensing function, and a touch sensing function. The integrated circuit 120 may sense the characteristics of a pixel and a touch or proximity of an external object, as well as applying data voltages corresponding to image data, at the lower side of the panel.

A timing controller 140 communicating with the integrated circuit 120 may be disposed at the lower side of the panel. Thus, the integrated circuit 120 may transmit pixel sensing data DATA+/−, including pixel sensing data and touch sensing data, in the form of a differential signal and clocks CLK+/− in the form of a differential signal to the timing controller 140 through a first communication line LN1 by an LVDS scheme. In addition, the timing controller 140 may transmit image data DATA+/− in the form of a differential signal to the integrated circuit 120 through a second communication line LN2 by an EPI scheme or a CEDS scheme.

In addition, a microcontroller 150 communicating with the timing controller 140 may be disposed at the lower side of the panel. Thus, the microcontroller 150 may transmit control data DATA and a clock CLK for the touch sensing circuit of the integrated circuit 120 to the timing controller 140 through a third communication line LN3 by an SPI scheme. In addition, the touch sensing circuit of the integrated circuit 120 may transmit touch sensing data DATA to the microcontroller 150 through the third communication line LN3 by an SPI scheme.

At the lower side of the panel, the integrated circuit 120 may be connected to a bonding pad of the panel 110 by a tape automated bonding (TAB) method or a chip-on-glass (COG) method, or may be formed directly on the panel 110, and in some cases, the integrated circuit 120 may be integrated to be formed on the panel 110. In addition, the integrated circuit 120 may be implemented by a chip-on-film (COF) method. In addition, both the timing controller 140 and the microcontroller 150 may be mounted to a single printed circuit board (PCB).

According to the display device of an embodiment described above, a panel driving circuit may almost not be required because the panel is driven at the lower side of the panel. Accordingly, interfaces or wires between circuits are able to be simplified, and the number of components is able to be reduced according thereto, which makes it possible to reduce power consumption or electromagnetic interference in each component.

In addition, the LVDS scheme, the EPI scheme, and the CEDS scheme used for data communication between the integrated circuit 120 and the timing controller 140 have a low signal level (small signal) so as to use a differential signal, so a signal swing thereof may be reduced. Therefore, electromagnetic interference may be reduced (low EMI). On the other hand, the SPI scheme used for data communication between the timing controller 140 and the microcontroller 150 may have a high signal level (large signal) and a large signal swing (high EMI). Therefore, electromagnetic interference may increase.

Conventionally, since the SPI scheme having a large signal swing is used between a plurality of touch sensing circuits and the microcontroller 150, overall electromagnetic interference may increase. However, according to the display device of an embodiment, since the SPI scheme is used between one timing controller 140 and one microcontroller 150, electromagnetic interference may be reduced as a whole.

Figure 8:
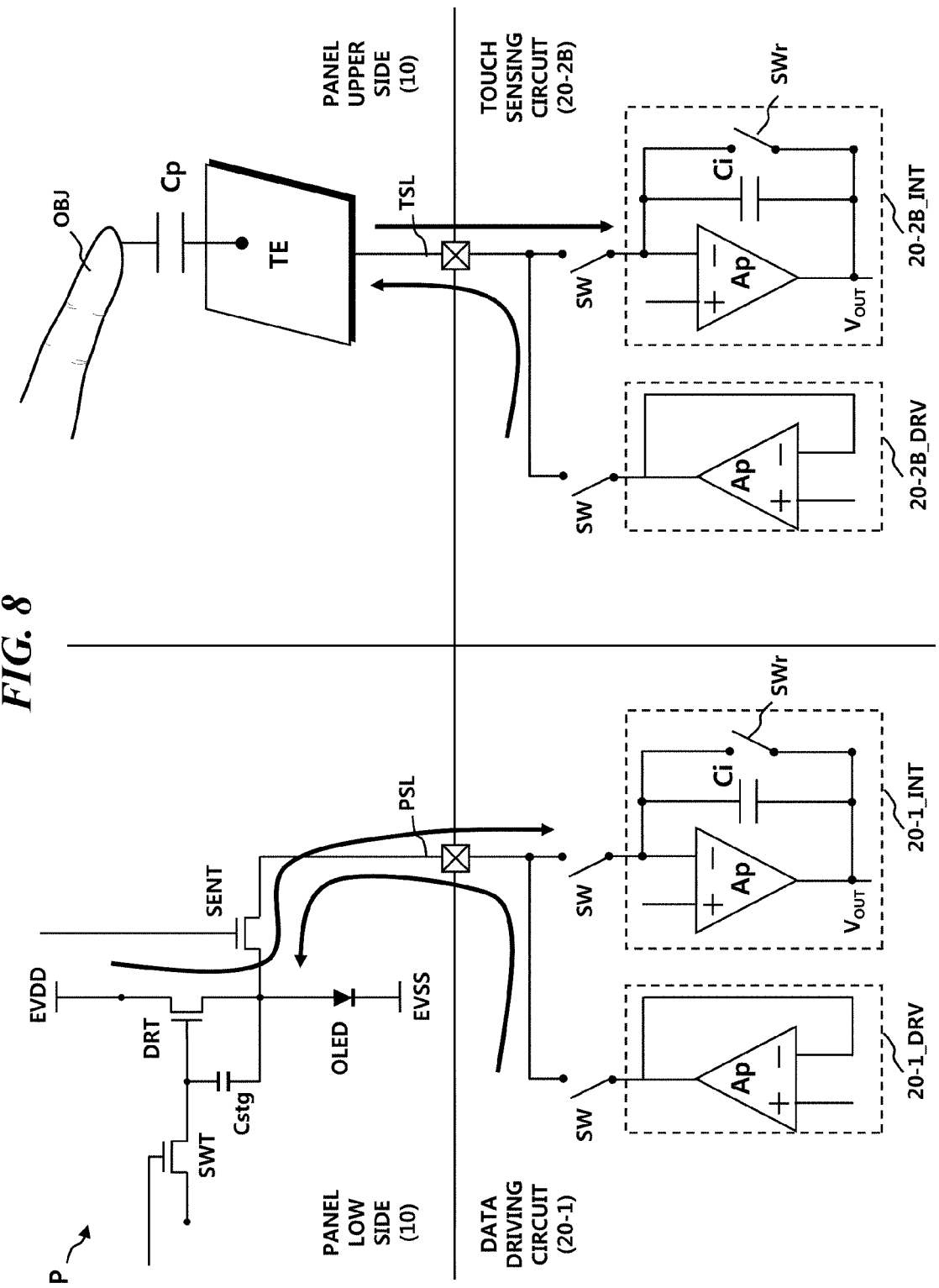
FIG. 8 is a diagram illustrating an example of internal circuits of a pixel sensing circuit and a touch sensing circuit.

FIG. 8 is a diagram illustrating an example of internal circuits of a pixel sensing circuit and a touch sensing circuit.

Referring to FIG. 8, the conventional data driving circuit 20-1 may apply a data voltage to a pixel P in order to output image data, and may sense the characteristics of a pixel P. In order to sense the characteristics of a pixel P, the data driving circuit 20-1 may include a pixel driving circuit 20-1_DRV and a pixel sensing integrator 20-1_INT. The data driving circuit 20-1 may further include a switch SW that controls the operation of the pixel driving circuit 20-1_DRV and a switch SW that controls the operation of the pixel sensing integrator 20-1_INT.

At the lower side of the panel 10, the pixel driving circuit 20-1_DRV may apply a pixel driving signal (e.g., a voltage) to the pixel P.

At the lower side of the panel 10, the pixel sensing integrator 20-1_INT may receive a pixel response signal (e.g., a voltage or a current) corresponding to the pixel driving signal. The pixel response signal may include information on the characteristics of a pixel. The characteristics of a pixel may include variations in the OLED and the driving transistor DRT included in the pixel caused by deterioration or by manufacturing processes thereof. For example, the characteristics of a pixel may include a threshold voltage, mobility, current characteristics, and the like of a driving transistor DRT. In addition, the characteristics of a pixel may include the degree of deterioration of the OLED such as parasitic capacitance, current characteristics, and the like of the OLED.

The pixel sensing integrator 20-1_INT may generate sensing data (i.e., a sensing voltage Vout) by demodulating the pixel response signal.

The pixel sensing integrator (20-1_INT) may include an amplifier Ap, a capacitor Ci connected between an input terminal (e.g., a negative input terminal) and an output terminal of the amplifier Ap, a reset switch SWr connected to the capacitor Ci in parallel, and the like.

The pixel sensing integrator 20-1_INT may integrate a pixel response signal using the capacitor Ci. The value integrated by the capacitor Ci may be reset by the reset switch SWr before subsequent integration is performed. The integrated value may be converted into pixel sensing data through a sample-and-hold (S&H) circuit and an analog-to-digital converter (ADC) and may then be output.

The pixel P may include an OLED, a driving transistor DRT, a switching transistor SWT, a sensing transistor SENT, a storage capacitor Cstg, and the like.

The OLED may include an anode electrode, an organic layer, a cathode electrode, and the like. Under the control of the driving transistor DRT, the anode electrode is connected to a driving voltage EVDD, and the cathode electrode is connected to a base voltage EVSS, thereby emitting light.

The driving transistor DRT may control the brightness of the OLED by controlling a driving current supplied to the OLED.

The switching transistor SWT may be electrically connected between the data line DL and the driving transistor DRT and may be turned on by receiving a scan signal through the gate line. If the switching transistor SWT is turned on, the data voltage of image data is transmitted to the driving transistor DRT.

The storage capacitor Cstg may be a parasitic capacitor provided between the driving transistor DRT and the OLED or may be an external capacitor that is intentionally designed outside the driving transistor DRT.

The sensing transistor SENT may connect the driving transistor DRT and the pixel sensing line PSL, and the pixel sensing line PSL may transmit a driving signal to the driving transistor DRT, and may transmit an analog signal (e.g., a voltage or a current) generated in the OLED to the pixel sensing integrator 20-1_INT.

Therefore, the pixel sensing integrator 20-1_INT may measure the characteristics of the pixel P using the analog signal transmitted through the pixel sensing line PSL. The pixel sensing integrator 20-1_INT may sense variations of the OLED and the driving transistor included in the pixel P caused by deterioration or by manufacturing processes thereof. That is, the pixel sensing integrator 20-1_INT may recognize a threshold voltage, mobility, current characteristics, and the like of the driving transistor DRT. In addition, the pixel sensing integrator 20-1_INT may recognize the degree of deterioration of the OLED, such as parasitic capacitance, current characteristics, or the like of the OLED.

In order to recognize the characteristics of the driving transistor DRT as described above, the data driving circuit 20-1 may drive a source terminal of the driving transistor DRT through the pixel driving circuit 20-1_DRV, and may detect the current flowing into the driving transistor DRT through the pixel sensing integrator 20-1_INT. The timing controller may reflect the detection result to image data to generate compensated image data and may transmit the compensated image data to the data driving circuit 20-1. The data driving circuit 20-1 may re-apply a data voltage for the compensated image data to the pixel P.

In addition, in order to recognize the characteristics of the OLED, the data driving circuit 20-1 may drive the OLED through the pixel driving circuit 20-1_DRV, and may detect the current flowing into the OLED through the pixel sensing integrator 20-1_INT. Alternatively, an external camera may detect the current flowing through the OLED by detecting a latitude variation of the pixel P. The timing controller may reflect the detection result to the image data to generate compensated image data and may transmit the compensated image data to the data driving circuit 20-1.

Meanwhile, conventionally, the touch sensing circuit 20-2B may sense a touch or proximity of an external object OBJ. In order to sense the touch or proximity, the touch sensing circuit 20-2B may include a touch driving circuit 20-2B_DRV and a touch sensing integrator 20-2B_INT. The touch sensing circuit 20-2B may further include a switch SW for controlling the operation of the touch driving circuit 20-2B_DRV and a switch SW for controlling the operation of the touch sensing integrator 20-2B_INT.

At the upper side of the panel 10, the touch driving circuit 20-2B_DRV may apply a touch driving signal (e.g., a voltage) to a touch electrode.

At the upper side of the panel 10, the touch sensing integrator 20-2B_INT may receive a touch response signal (e.g., a voltage or a current) in response to the touch driving signal. The touch response signal may include information on the presence of a touch or proximity (e.g., a change in capacitance Cp between an external object OBJ and a touch electrode TE). The touch sensing integrator 20-2B_INT may demodulate the touch response signal, thereby generating sensing data (e.g., a sensing voltage Vout).

The touch sensing integrator 20-2B_INT may be configured in the same manner as the pixel sensing integrator 20-1_INT to perform the same function. The touch sensing integrator 20-2B_INT may integrate a touch response signal using the capacitor Ci. The value integrated by the capacitor Ci may be reset by the reset switch SWr before subsequent integration is performed. The integrated value may be converted into touch sensing data through a sample-and-hold circuit and an analog-to-digital converter and may then be output.

Figure 9:
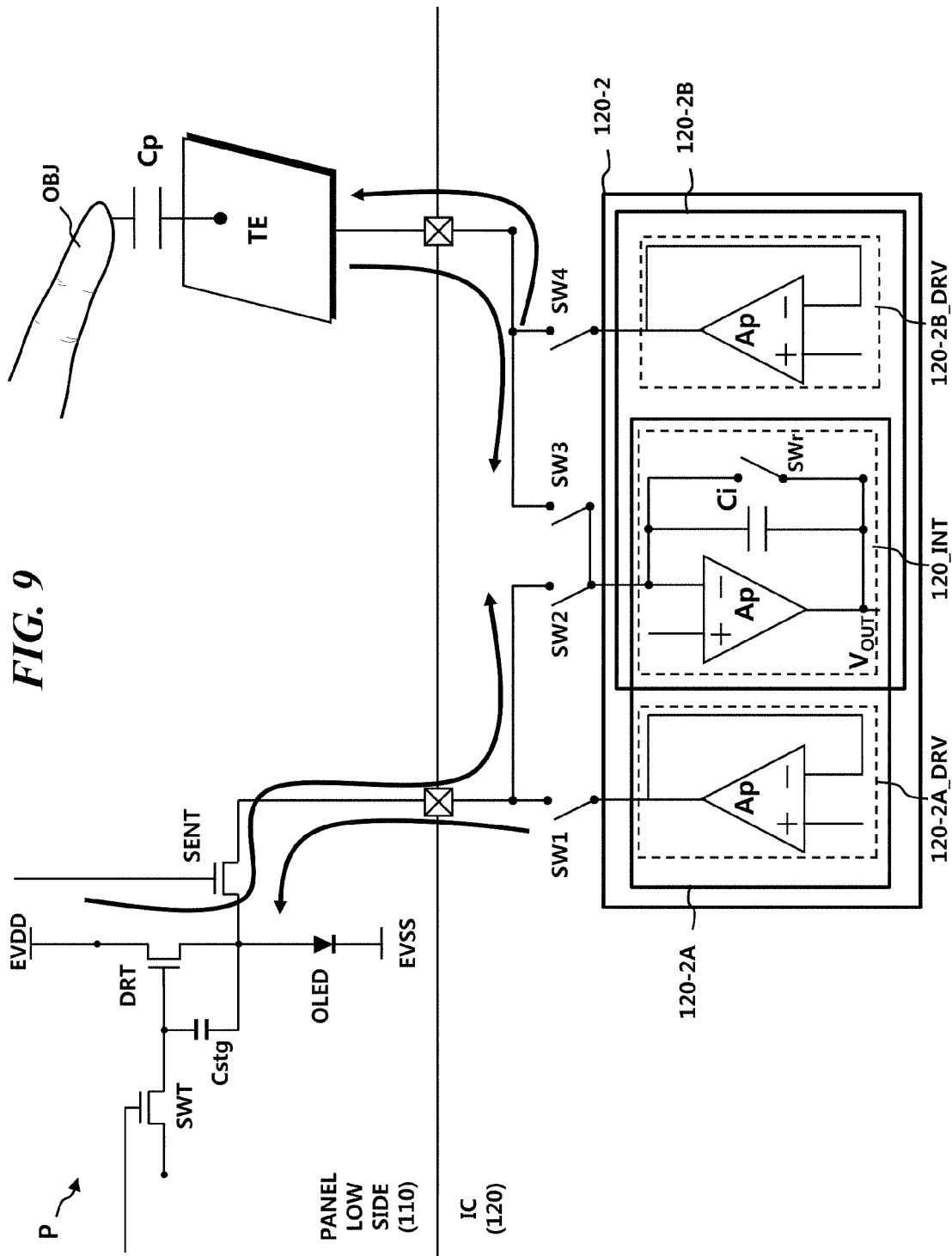
FIG. 9 is a diagram illustrating a first example of internal circuits of an integrated circuit according to an embodiment.

FIG. 9 is a diagram illustrating a first example of internal circuits of an integrated circuit according to an embodiment.

Referring to FIG. 9, an integrated circuit 120 according to an embodiment may apply a data voltage to a pixel P in order to output image data, and may sense the characteristics of the pixel P and a touch or proximity of an external object OBJ. In order to sense the characteristics of the pixel P, the integrated circuit 120 may include a pixel sensing circuit 120-2A. In addition, in order to sense a touch or proximity, the integrated circuit 120 may include a touch sensing circuit 120-2B. Here, the pixel sensing circuit 120-2A and the touch sensing circuit 120-2B may be referred to as "sensing circuits".

The pixel sensing circuit 120-2A may include a pixel driving circuit 120-2A_DRV and a sensing integrator 120_INT. At the lower side of the panel 110, the pixel driving circuit 120-2A_DRV may apply a pixel driving signal (e.g., a voltage) to the pixel P. At the lower side of the panel 110, the sensing integrator 120_INT may receive a pixel response signal (e.g., a voltage or a current) in response to the pixel driving signal. The pixel response signal may include information on the characteristics of a pixel. The characteristics of a pixel may include variations in the OLED and the driving transistor DRT included in the pixel caused by deterioration or by the manufacturing processes thereof. For example, the characteristics of a pixel may include a threshold voltage, mobility, current characteristics, and the like of a driving transistor DRT. In addition, the characteristics of a pixel may include the degree of deterioration of the OLED such as parasitic capacitance, current characteristics, and the like of the OLED.

In addition, the sensing integrator 120_INT may measure the characteristics of the pixel P using the analog signal transmitted through the pixel sensing line PSL. The sensing integrator 120_INT may sense variations of the OLED and the driving transistor included in the pixel P caused by deterioration or by the manufacturing processes thereof. That is, the sensing integrator 120_INT may recognize a threshold voltage, mobility, current characteristics, and the like of the driving transistor DRT. In addition, the sensing integrator 120_INT may recognize the degree of deterioration of the OLED, such as parasitic capacitance, current characteristics, and the like of the OLED.

In order to recognize the characteristics of the driving transistor DRT as described above, the integrated circuit 120 may drive a source terminal of the driving transistor DRT through the pixel driving circuit 120-2A_DRV, and may detect the current flowing into the driving transistor DRT through the sensing integrator 120_INT. The timing controller may reflect the detection result to image data to generate compensated image data and may transmit the compensated image data to the integrated circuit 120. The integrated circuit 120 may re-apply a data voltage for the compensated image data to the pixel P.

In addition, in order to recognize the characteristics of the OLED, the integrated circuit 120 may drive the OLED through the pixel driving circuit 120-2A_DRV, and may detect the current flowing into the OLED through the sensing integrator 120_INT. Alternatively, an external camera may detect the current flowing through the OLED by detecting a latitude variation of the pixel P. The timing controller may reflect the detection result to the image data to generate compensated image data and may transmit the compensated image data to the integrated circuit 120.

Meanwhile, the touch sensing circuit 120-2B may include a touch driving circuit 120-2B_DRV and a sensing integrator 120_INT. At the lower side of the panel 110, the touch driving circuit 120-2B_DRV may apply a touch driving signal (e.g., a voltage) to a touch electrode TE. At the lower side of the panel 110, the sensing integrator 120_INT may receive a touch response signal (e.g., a voltage or a current) in response to the touch driving signal. The touch response signal may include information on the presence of a touch or proximity (e.g., a change in capacitance Cp between an external object OBJ and a touch electrode TE). The sensing integrator 120_INT may demodulate the touch response signal, thereby generating sensing data (e.g., a sensing voltage Vout).

Here, the pixel sensing circuit 120-2A and the touch sensing circuit 120-2B may share the sensing integrator 120_INT. The sensing integrator 120_INT may generate sensing data on the characteristics of a pixel P or may generate sensing data on a touch or proximity.

The integrated circuit 120 may include switches SW1 to SW4 that control the sensing integrator 120_INT such that the sensing integrator 120_INT performs one of either pixel sensing or touch sensing. For example, in the case where the sensing integrator 120_INT senses the pixel P, a first switch SW1 and a second switch SW2 may be closed, and a third switch SW3 and a fourth switch SW4 may be opened. Then, the sensing integrator 120_INT may exchange signals with the pixel P. Alternatively, in the case where the sensing integrator 120_INT senses a touch or proximity, the first switch SW1 and the second switch SW2 may be opened, and the third switch SW3 and the fourth switch SW4 may be closed. Then, the sensing integrator 120_INT may exchange signals with the touch electrode TE.

As described above, in the prior art, since the touch sensing circuit 120-2B is separated to be located outside the integrated circuit 120, the pixel sensing circuit 120-2A and the touch sensing circuit 120-2B must include an integrator, respectively. However, in an embodiment, since both the pixel sensing circuit 120-2A and the touch sensing circuit 120-2B are mounted to the integrated circuit 120, only one integrator to be shared may be included.

Figure 10:
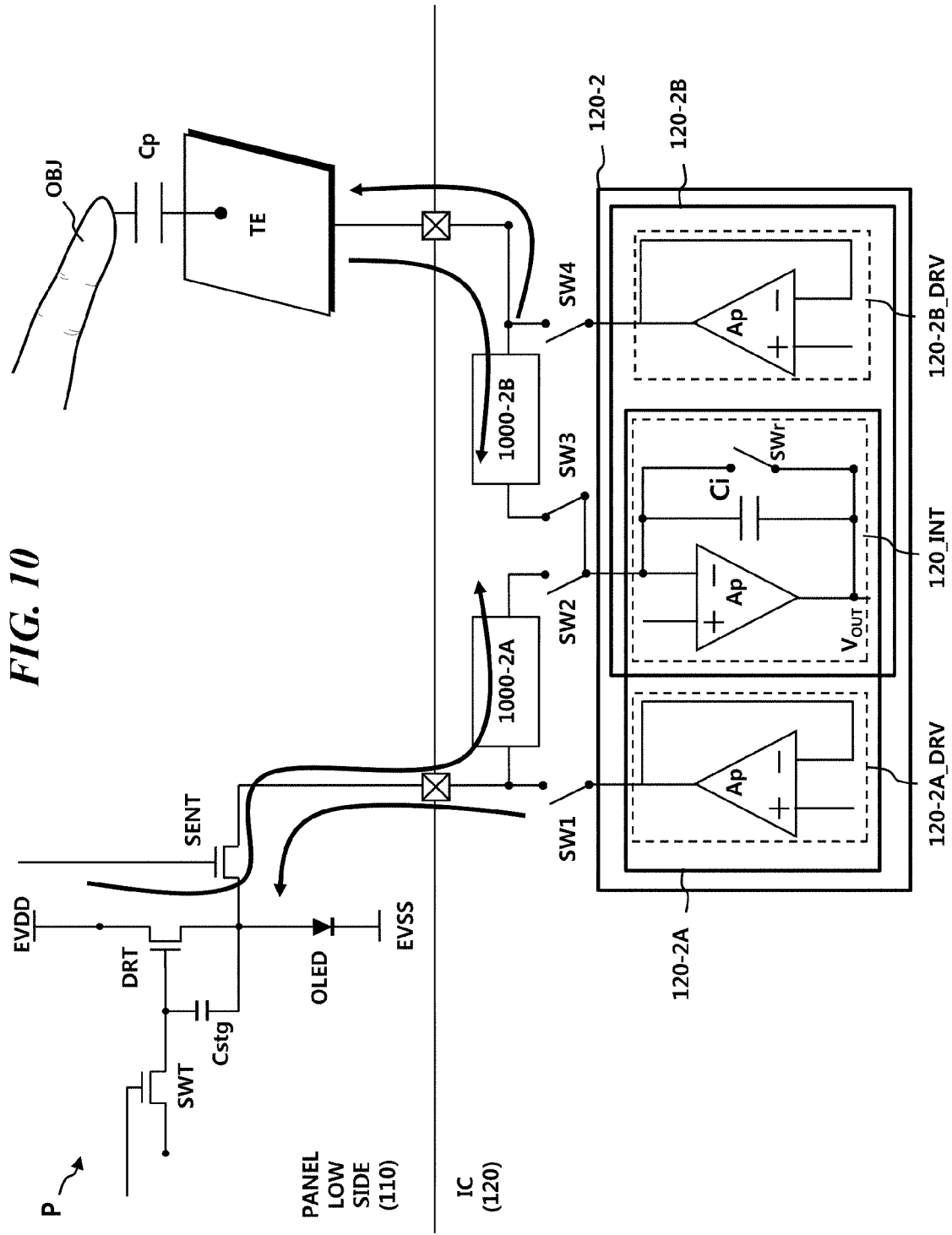
FIG. 10 is a diagram illustrating a second example of internal circuits of an integrated circuit according to an embodiment.

FIG. 10 is a diagram illustrating a second example of internal circuits of an integrated circuit according to an embodiment.

Referring to FIG. 10, according to an embodiment, the integrated circuit 120 may include signal adjusting circuits 1000-2A and 1000-2B for adjusting the intensity of a pixel response signal, including information on the characteristics of a pixel P, and the intensity of a touch response signal including information on a touch or proximity of an external object OBJ. The signal adjusting circuits 1000-2A and 1000-2B may include a first signal adjusting circuit 1000-2A and a second signal adjusting circuit 1000-2B.

The first signal adjusting circuit 1000-2A may be disposed on a path through which a pixel response signal enters the sensing integrator 120_INT, thereby controlling the pixel response signal. For example, the first signal adjusting circuit 1000-2A may be disposed between the first switch SW1 and the second switch SW2 so as to be connected to the pixel driving circuit 120-2A_DRV and the sensing integrator 120_INT.

The second signal adjusting circuit 1000-2B may be disposed on a path through which a touch response signal enters the sensing integrator 120_INT, thereby controlling the touch response signal. For example, the second signal adjusting circuit 1000-2B may be disposed between the third switch SW3 and the fourth switch SW4 so as to be connected to the touch driving circuit 120-2B_DRV and the sensing integrator 120_INT.

The first signal adjusting circuit 1000-2A may amplify the pixel response signal, and the second signal adjusting circuit 1000-2B may attenuate the touch response signal. The level of a signal for sensing the touch electrode TE may be greater than the level of a signal for sensing the pixel P. One shared sensing integrator 120_INT must sense both the pixel P and the touch electrode TE, but if the sensing integrator 120_INT focuses on one sensing, other sensing cannot be performed properly. For example, if the sensing integrator 120_INT is configured to sense the characteristics of a pixel P, the sensing integrator 120_INT optimized for the pixel response signal having a low level may not be able to perform appropriate demodulation of the touch response signal having a high level due to the difference in performance. Accordingly, the first signal adjusting circuit 1000-2A and the second signal adjusting circuit 1000-2B may adjust the signal to conform to the performance of the sensing integrator 120_INT.

Figure 11:
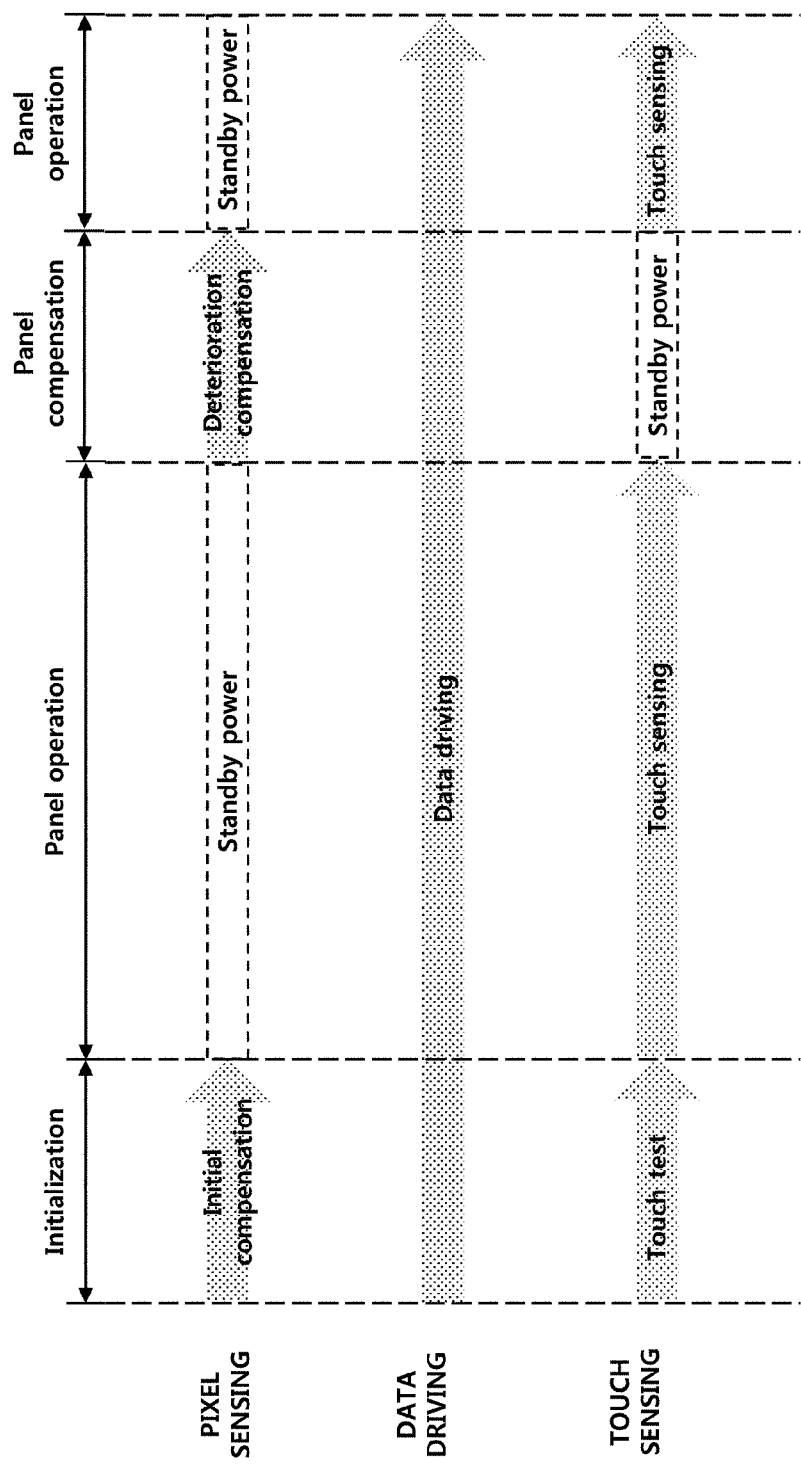
FIG. 11 is a diagram illustrating operation times of data driving, pixel sensing, and touch sensing in a display device.

FIG. 11 is a diagram illustrating operation times of data driving, pixel sensing, and touch sensing in a display device.

Referring to FIG. 11, in the related art, data driving, pixel sensing, and touch sensing are independently performed in separate circuits, so that standby power may be required for the circuit that is not operating. In the case where the operation of the display device is classified into an initialization step, a panel operation step, and a panel compensation step, data driving, pixel sensing, and touch sensing may or may not occur in each step. Here, the initialization step may include the step in which the circuits are mass-produced in a factory.

Pixel sensing may be performed by a pixel sensing circuit. Since the pixel sensing circuit may be included in the data driving circuit, pixel sensing may also be performed by the data driving circuit. Data driving may be performed by the data driving circuit. Touch sensing may be performed by the touch sensing circuit.

Pixel sensing may be performed in the initialization step and the panel compensation step. The initial compensation in the initialization step may be understood as detecting and removing mura using a camera. Deterioration compensation in the panel compensation step may be understood as compensating for the deterioration of the driving transistor of the pixel. Since pixel sensing is not performed in the panel operation step, some of the pixel sensing circuit or the data driving circuit is not used, and standby power may be consumed there.

Data driving may be performed in the initialization step, the panel operation step, and the panel compensation step.

Touch sensing may be performed in the initialization step and the panel operation step. The touch test in the initialization step may be understood as normalizing a touch panel or detecting defects in the touch panel. The panel operation step may be understood as sensing a touch or proximity of an external object. Since touch sensing is not performed in the panel compensation step, the touch sensing circuit is not used, and standby power may be consumed there.

Figure 12:
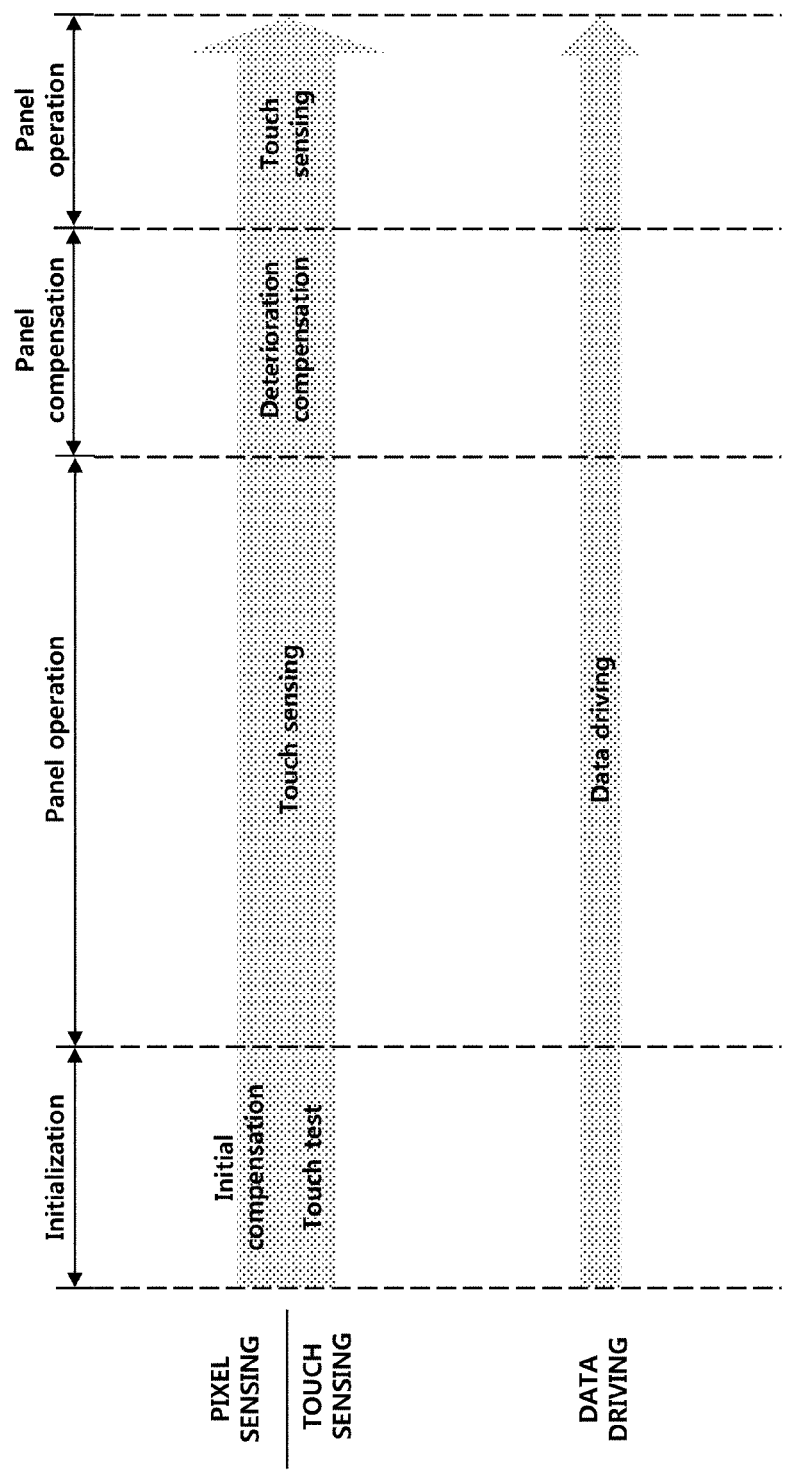
FIG. 12 is a diagram illustrating operation times of data driving, pixel sensing, and touch sensing in a display device according to an embodiment.

FIG. 12 is a diagram illustrating operation times of data driving, pixel sensing, and touch sensing in a display device according to an embodiment.

Referring to FIG. 12, according to an embodiment, data driving, pixel sensing, and touch sensing may be performed in one integrated circuit, so standby power may not be required for a circuit that is not operating. In particular, one sensing circuit of the integrated circuit may perform both pixel sensing and touch sensing, thereby increasing the frequency of use of the circuit and eliminating standby power.

Pixel sensing and touch sensing may be performed by one sensing circuit. Data driving may be performed by the data driving circuit.

Data driving may be performed in the initialization step, the panel operation step, and the panel compensation step. In addition, pixel sensing may be performed in the initialization step and the panel compensation step, and touch sensing may be performed in the initialization step and the panel operation step. Thus, the sensing circuit may operate in all steps. Since the sensing circuit is used in all steps, the frequency of use of the sensing circuit may increase, and standby power may not be required therefor.

What is claimed is:

1. An integrated circuit for driving a panel through a plurality of internal circuits, the integrated circuit comprising:
   a first internal circuit configured to perform first sensing on a panel; and
   a second internal circuit configured to perform second sensing on the panel, the second sensing different from the first sensing,
   wherein the first internal circuit drives a pixel disposed on the panel to sense characteristics of the pixel,
   wherein the second internal circuit drives a touch electrode disposed on the panel to sense a touch or a proximity of an external object, and
   wherein the first internal circuit and the second internal circuit share an integrator configured to generate sensing data on the characteristics of the pixel or sensing data on the touch or the proximity.

2. The integrated circuit of claim 1, wherein the first internal circuit senses a variation of an organic light-emitting diode (OLED) and a driving transistor included in the pixel caused by deterioration or by a manufacturing process thereof.

3. The integrated circuit of claim 1, further comprising switching circuits configured to connect the integrator to the pixel in order to sense the characteristics of the pixel or connect the integrator to the touch electrode in order to sense the touch or the proximity.

4. The integrated circuit of claim 1, further comprising a first signal adjusting circuit configured to increase an intensity of a pixel response signal comprising information on the characteristics of the pixel.

5. The integrated circuit of claim 1, further comprising a second signal adjusting circuit configured to reduce an intensity of a touch response signal comprising information on the touch or the proximity.

6. The integrated circuit of claim 1, wherein the first internal circuit and the second internal circuit share a communication line in order to exchange data with an external circuit.

7. The integrated circuit of claim 1, further comprising a third internal circuit configured to apply a data voltage for image data to the pixel in order to output the image data.

8. The integrated circuit of claim 7, wherein the third internal circuit uses a communication line, which is different from the communication line used by the first internal circuit and the second internal circuit, in order to exchange data with an external circuit.

9. The integrated circuit of claim 1, wherein the second internal circuit transmits sensing data on the touch or the proximity to a timing controller.

10. The integrated circuit of claim 1, wherein the first internal circuit and the second internal circuit are disposed to be positioned at one side of the panel to drive the panel.

11. A timing controller comprising:
- a receiving circuit configured to receive first sensing data on characteristics of a pixel and second sensing data on a touch or a proximity of an external object through a first communication line; and
- a transmitting circuit configured to transmit the second sensing data to an external circuit,
- wherein the transmitting circuit uses a third communication line to transmit the second sensing data to a microcontroller, and, in the first communication line or a second communication line, data is received in a form of a signal with a lower voltage level than that in the third communication line.

12. The timing controller of claim 11, further comprising a controlling circuit configured to compensate for image data using the first sensing data, wherein the transmitting circuit transmits the image data to an integrated circuit configured to apply a data voltage corresponding to the image data to the pixel.

13. The timing controller of claim 12, wherein the transmitting circuit transmits the image data to the integrated circuit through a second communication line different from the first communication line.

14. The timing controller of claim 12, wherein the controlling circuit generates coordinates for the touch or the proximity using the second sensing data.

\* \* \* \* \*